L. O. COLVIN.
Cow Milker.

No. 54,865.

Patented May 22, 1866.

Witnesses
J. H. Coombs
L. Holms Jr

Inventor
L. O. Colvin

UNITED STATES PATENT OFFICE.

L. O. COLVIN, OF NEW YORK, N. Y.

IMPROVEMENT IN COW-MILKERS.

Specification forming part of Letters Patent No. 54,865, dated May 22, 1866.

*To all whom it may concern:*

Be it known that I, LEIGHTON O. COLVIN, of the city, county, and State of New York, have invented a new and useful Improvement in Cow-Milkers; and I do hereby declare that the following is a full, clear, and exact description of the same, reference being had to the accompanying drawings, making a part of this specification, in which—

Figure 1:
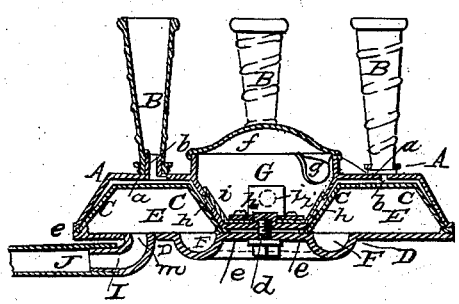
Figure 2:
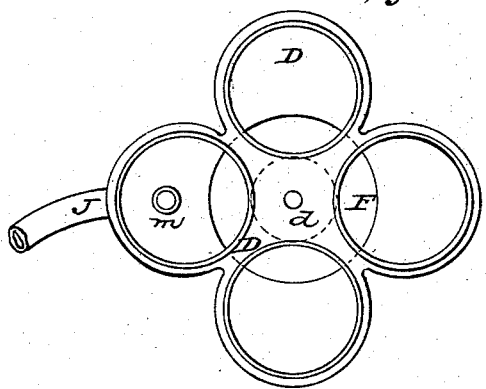
Figure 3:
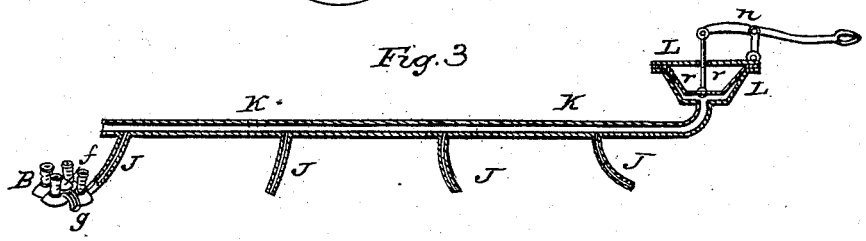

Figure 1 is a transverse section of one of the cow-milkers alone. Fig. 2 is a plan view of the bottom plate thereof. Fig. 3 is a longitudinal section of the pipes and of the separate or independent pump by which the milkers are operated, showing their connection with the said milkers.

Similar letters of reference indicate corresponding parts in all the figures.

This invention relates to cow-milkers in which flexible diaphragms are used to draw the milk from the teats and deliver it into suitable receptacles.

The principal object of the improvement is to enable the milking in large dairies to be performed by hand, steam, or other power, so applied as to work any number of milkers and milk any number of cows at the same time, and thereby to effect a great saving of time and labor.

The improvement consists in the construction of a cow-milker, whereby it may be actuated through the agency of water or other fluid, which is made to act upon the opposite side of the diaphragm to that which is in contact with the milk by means of a pump which is connected with the several milkers by a pipe or pipes, the said water or other fluid filling the said pipe or pipes and the whole of the space between the diaphragms of the milkers, and the pump is only separated from the milk by means of the flexible diaphragms of the milkers.

To enable others skilled in the art to make and use my invention, I will proceed to describe it with reference to the drawings.

A is the top plate of the body of the milker, to which the other portions thereof are attached, and which may be made of cast-iron or other suitable material. Formed in the under side of this plate A, and near the circumference thereof, are four chambers, $a$, which have the shape of a frustum of a cone, as more clearly shown in Fig. 1. Each of these chambers $a$ has an opening, $b$, in its upper side, each of the said openings $b$ being surrounded at its upper end by a short tubular stem, (shown at $c$ in Fig. 1,) and upon each of these stems $c$ is secured a teat tube or socket, B, in which the teat of the cow is placed during the operation of milking, and which may be of india-rubber or similar elastic gum or substance, and stiffened by a spiral wire wound around or within the same.

C represents flexible diaphragms or pistons, of which there is one in each chamber $a$. The said diaphragms correspond very nearly in shape with the interior of the said chambers $a$, and are made of india-rubber or other flexible and impervious material. Each diaphragm has an annular flange, $e$, around its lower and outer edge or periphery, and these flanges are closely clasped and compressed between the top plate, A, and the bottom plate, D, the said bottom plate being firmly secured to the top plate, A, by a strong central screw, $d$. The diaphragms C, being similar in shape to the chamber $a$, are concave or hollow on their under sides, or, in other words, have chambers formed between them and the bottom plate, D, as shown at E in Fig. 1. These chambers E communicate with each other by means of an annular channel, F. Formed in the upper side of the bottom plate, D, is a central milk-chamber, G, which is provided with a fixed cover, $f$, and with an outwardly-projecting spout, $g$. This milk-chamber G communicates with the several chambers $a$ by means of openings $h$, each of the said openings $h$ being covered by a flexible valve, $i$, which opens to allow the milk to pass into the milk-chamber G, and closes the said openings $h$ the remainder of the time.

During the operation of the milker the milk flows from the teat-tubes B, through the openings $b$, into the chambers $a$, and thence, through the openings $h$, into the central milk-chamber, G, and then out, through the spout $g$, into a pail or other vessel placed to receive it, as will be hereinafter further explained.

$m$ is an opening formed in the bottom plate, D, and communicating with one of the chambers E. A curved tube, I, is fitted to this opening $m$, and has attached to its outer end a flexible tube or pipe, J. The opposite end of this pipe J communicates with a main pipe, K, which is closed at one end and has its opposite or open end connected with a suitable pump, L, as shown in Fig. 3. This pump L may be a simple diaphragm-pump, as shown in the drawings, or be of any other suitable construction, and may be worked by hand by means of a lever, n, or by steam or other power.

Any desired number of the flexible pipes or tubes J may be connected with the main pipe K, branching out therefrom, as shown in Fig. 3, each of the said branch pipes J having a milker attached to its outer end, in the manner shown in Fig. 1 and hereinbefore fully explained. The main pipe K and that part of the pump L below its piston or diaphragm r, as well as the branch pipes J and the chambers E and annular channels F of the several milkers, are all filled with water, in such manner that the motion communicated to the water by the operation of the pump L will operate the diaphragms C of the milkers to pump or draw the milk from the teats of the cow when placed in the teat-tubes B, as will be presently fully set forth.

The teats of each cow are placed one in each of the teat tubes or sockets B of one of the milkers, the milker being supported in proper position near the udder either by the hand or by an elastic stool or any other suitable support. This being done, the piston or diaphragm r of the main or separate pump L is worked up and down either by operating the lever n by hand or by any other means. The upward movement of the said piston or diaphragm r produces a vacuum underneath the same, which draws a portion of the water up into the body of the pump L, and thus draws the water away from under the diaphragms C of the milkers, thus producing a vacuum underneath the said diaphragms C, which moves them downward and produces a corresponding vacuum above them in the chambers a, which draws the milk from the teats placed in the teat-tubes B into the said chambers, and thence, through the openings h, milk-chambers G, and spouts g, to the pail or other receptacle, as hereinbefore explained. The piston or diaphragm r of the main pump L being then moved downward, the water flows back by its own gravity or pressure and raises the diaphragms C to their first position, whereupon a repetition of the upward movement of the said piston r of the pump L again draws the milk from the teats in the manner just described, the operation being thus continued until the cows are milked, Inasmuch as the chambers a of each milker are entirely separate from each other, (except when the valves h are raised by the passage of the milk into the milk-chambers G, as described,) it follows that one or more teats may be removed or withdrawn from their teat-tubes B when desired without at all interfering with the operation of the milker upon the remaining teats. In like manner the operation of one of the milkers will not be modified by the entire removal from the cow of any or all the others, the action of the water upon the piston or diaphragms C of the milkers insuring the prompt and uniform operation of all the milkers attached to the main pipe K; and by thus simultaneously operating any desired number of cow-milkers a much less expenditure of time and labor is required in milking a large quantity of cows than when the milkers are operated separately by hand, as heretofore practiced, enabling the milkers to be used with especial advantage in large dairies.

What I claim as new, and desire to secure by Letters Patent, is—

1. The construction of a cow-milker in such manner that it may be operated by water or other fluid acting upon its flexible diaphragms, substantially as herein specified.

2. So constructing the water-spaces on the backs of the several flexible diaphragms of a cow-milker that all are in free communication and made to communicate with a single pipe, substantially as herein specified.

3. The combination of two or more cow-milkers with a pump, L, or its equivalent, by means of a pipe or pipes filled with water or other fluid, substantially as set forth, for the purpose specified.

L. O. COLVIN.

Witnesses:
A. LE CLERC,
SAM. L. HARRIS.